I. ONO.
DENTAL PRESSURE GAUGE.
APPLICATION FILED AUG. 27, 1921.
1,427,496.
Patented Aug. 29, 1922.
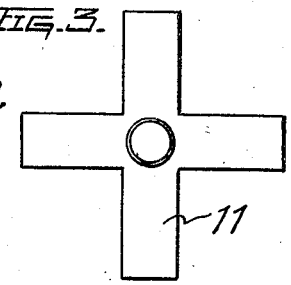
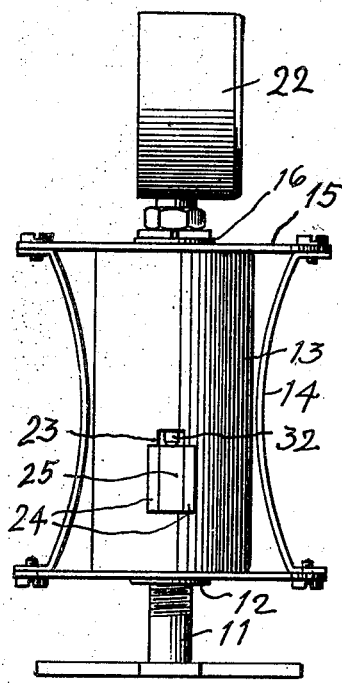
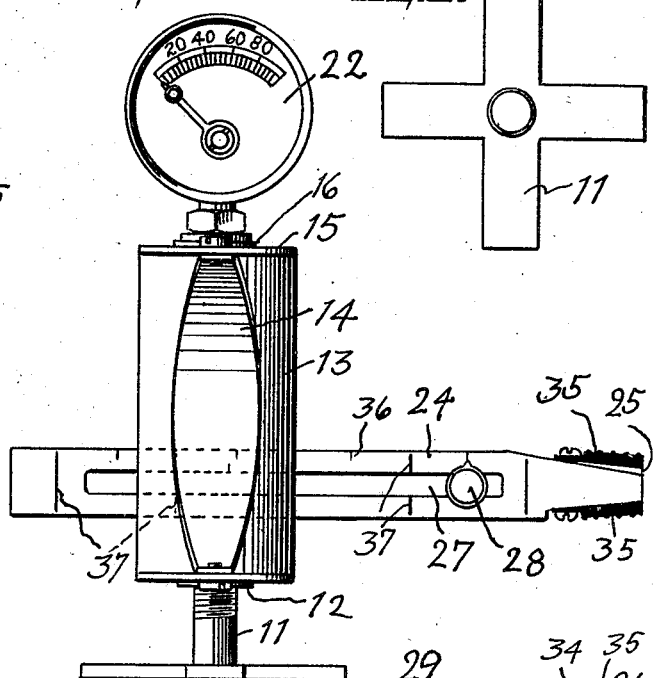
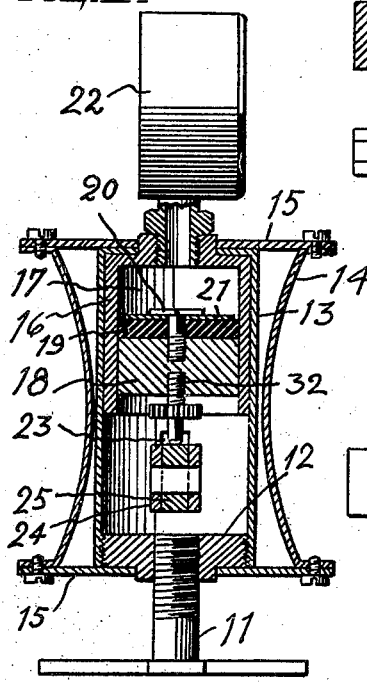
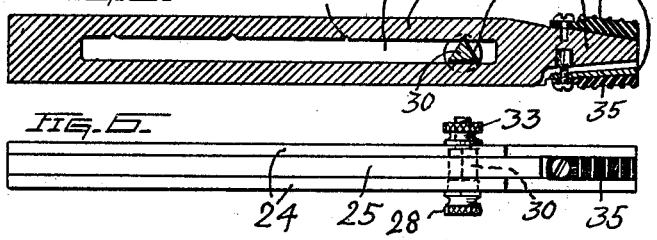
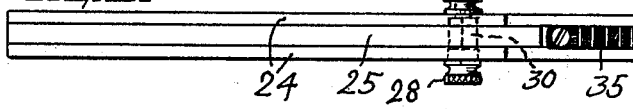
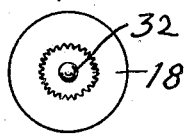
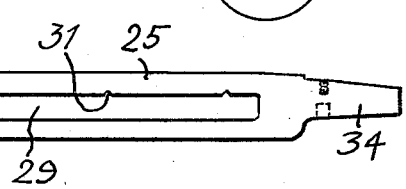
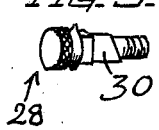
INVENTOR:
Iwao Ono.
By Atty.

UNITED STATES PATENT OFFICE.

IWAO ONO, OF LOS ANGELES, CALIFORNIA.

DENTAL PRESSURE GAUGE.

1,427,496.　　　　　Specification of Letters Patent.　　Patented Aug. 29, 1922.

Application filed August 27, 1921. Serial No. 496,102.

*To all whom it may concern:*

Be it known that I, IWAO ONO, a subject of the Emperor of Japan, residing in the city and county of Los Angeles and State of California, have invented a new and useful Dental Pressure Gauge, of which the following is a specification.

This invention has relation to means for ascertaining the pressure capable of being exerted by a person in the act of biting with the teeth and jaws, the invention embodying a device which is useful for ascertaining the pressure exerted by gripping with the hand.

The object of this invention is to produce a device by which the pressure exerted in the act of biting, is visually indicated by a fluid pressure gauge, and to produce a device of this character in which the pressure gauge is adjustable to the view from different angles and positions.

Other objects and advantages will hereinafter appear; and the invention consists in a pressure cylinder in communication with a fluid pressure gauge, a plunger working in the cylinder, and means adapted for operation by a bite of the teeth or jaws for actuating the piston.

In the drawings, Figure 1 is an end elevation of my improved device. Fig. 2 is a side elevation of the same. Fig. 3 is a top plan view of the base member. Fig. 4 is a vertical and mid-sectional view of the device. Fig. 5 is a longitudinal sectional view of the fulcrum lever elements. Fig. 6 is a top plan view thereof. Fig. 7 is a bottom plan view of the pressure plunger. Fig. 8 is a detail side view of the central fulcrum lever element. Fig. 9 is a perspective detail view of the fulcrum bolt.

Referring to the drawings, my improved bite-gauge consists of a base member 11, screwed to cylinder-head 12, attached to cylinder casing 13. Handles 14 are attached to and retain the top and bottom flange members 15, on the casing; the handles serving to permit the device to be conveniently held by the dentist or operator. The casing has revolubly mounted therein, an inner cylindrical member 16, forming a pressure chamber 17, in which is mounted plunger 18, provided with a gasket 19, retained thereon by bolt 20 and washer 21. Gasket 19 is adapted to prevent leakage of the oil which is used within the pressure chamber. At the upper end of the inner cylindrical member 16, I have provided a fluid pressure gauge 22, in constant communication with chamber 17. The pressure gauge is not illustrated in detail, as there are several pressure gauges now in use and on the market, and any fluid pressure gauge may be used in combination with the pressure chamber.

Casing 13 is provided with oppositely disposed apertures 23, in which are mounted the adjustable and transversely extending fulcrum bars 24, and tiltable fulcrum member 25. Bars 24 are united at one end by web 26, and are provided with longitudinal slots 27. A fulcrum bolt 28, extends transversely through slots 27, and through slot 29, in fulcrum member 25. Fulcrum bolt 28 is provided with a triangular part 30, adapted to engage with notches 31 in the upper side of slot 29. A bearing member 32, mounted on plunger 18, is in engagement with central fulcrum member 25. The fulcrum bolt 28 is secured by a clamp-nut 33.

The outer extremity 34, of tiltable member 25, and web portion 26, of bars 24, have mounted thereon corrugated plates 35, which are engaged by the teeth when the biting capacity is to be tested. By providing bars 24, with graduated marks 36, the fulcrum bolt 28 may be readily set to engage with any of the notches 31 in tiltable member 25. The graduated marks 37, indicate points for setting bars 24 relative to casing 13, and thus additional adjustment of the fulcrum bolt 28, relative to the working plunger, is provided.

In use, the registering capacity of the device is increased and decreased, by setting the fulcrum bolt near to or away from the point of contact of bearing member 32, on tiltable member 25, thereby varying the relative length of the fulcrum arms of member 25. Relative variation is further obtained by adjustment of the fulcrum bolt 28, in slots 27 and 29. The pressure chamber being filled with a suitable oil, the corrugated extremities of the fulcrum bars 24 and tiltable fulcrum member 25, are placed in the mouth of the person whose bite is to be tested. The relative degree of pressure is then displayed by the pressure gauge, which may be turned at any angle to be conveniently read by the dentist or operator. For registering or indicating the lowest pressure, the fulcrum bolt is set in its outermost position in slots 27 and 29, and the supporting bars 24 are shifted in apertures 23, so that the fulcrum arm of the tiltable member extending beneath the plunger, has its relatively shortest length, and the arm of the tiltable member engaged by the teeth, has its relatively longest length. If the pressure is then in excess of the capacity of the gauge 22, the device may be further adjusted until the degree of pressure is registered by the gauge. For determining the pressure which may be exerted by the grip of the hands, the fulcrum supporting bars and tiltable member shown, may be interchanged for longer ones.

While simple and efficient means are herein provided for accomplishing the objects of the invention, and the elements shown are well adapted to serve the purposes for which they are intended, it is to be understood that I do not limit myself to the precise construction shown in the drawings, but that the invention may be altered and varied in minor details within the scope of the appended claims.

What is claimed is:

1. The combination with a standard, of a cylindrical body member supported by the standard, said body member having oppositely disposed apertures, an inner cylindrical casing revolubly mounted within the body member, a plunger working within the casing, a fluid pressure gauge mounted on the upper end of the revoluble casing, and in communication with the chamber formed by the plunger and inner casing, fulcrum bars extending transversely through the body member and disposed in said apertures, a tiltable fulcrum bar disposed between the first-named fulcrum bars, a bearing member associated with the plunger and engaging with the tiltable fulcrum member, and a fulcrum bolt passing through said fulcrum bars, and adjustable relative thereto and relative to the bearing member on the plunger.

2. The combination with a standard, of a cylindrical body member supported thereby, an inner casing concentric with the body member, a plunger working in the inner casing and forming therewith a pressure chamber, a pressure gauge fixed to the inner casing and in communication with the pressure chamber, fulcrum bars extending through the body member and beneath the inner casing, one of said bars being tiltable relative to the remaining bars, a bearing member mounted on the plunger and engaging with the intermediate tiltable fulcrum bar, and a detachable fulcrum bolt for changing the fulcrum point of the intermediate fulcrum bar.

3. The combination with a standard, of a body member supported thereby, an inner casing concentric with the body member, a plunger working in the inner casing, a fluid pressure gauge in communication with the pressure chamber formed by the inner casing and plunger, supporting fulcrum bars extending transversely through the body member and beneath the inner casing, a tiltable fulcrum bar associated with the supporting bars, a bearing member adjustable relative to the plunger and mounted therein, and bearing upon the tiltable fulcrum bar, and a fulcrum bolt extending through the fulcrum bars.

4. The combination with a standard, of a body member supported thereby, an inner casing revolubly mounted in and concentric with the body member, a piston working therein, a fluid pressure gauge on the inner casing and in communication with the pressure chamber formed by the casing and piston, and means operated by engagement with the teeth for actuating the piston.

5. The combination with a standard, of a body member supported thereby, a casing in the body member and enclosing a pressure chamber, a piston working in the pressure chamber, and means mounted in the body member and adapted to be operated by the teeth for actuating the piston.

6. The combination with a standard, of a body member supported thereby, an inner casing revolubly mounted in and concentric with the body member, a piston working therein, a fluid pressure gauge mounted on the inner casing and in communication with the pressure chamber formed by the inner casing and plunger, fulcrum supporting bars extending transversely through the body member and adjustable relative thereto, said supporting bars having longitudinal slots therein, a tiltable fulcrum bar mounted between the supporting fulcrum bars, a bearing member mounted in the plunger and engaging with the tiltable fulcrum bar, the said tiltable bar having a longitudinal slot, and a fulcrum bolt extending through said longitudinal slots and adjustable therein.

7. The combination with a standard, of a body member supported thereby, an inner casing mounted in the body member, a fluid pressure gauge on the inner casing, a plunger working in the inner casing, supporting bars extending transversely through the body member and adjustable therein, a tiltable lever disposed between the supporting bars, and a movable fulcrum bolt extending through the supporting bars and tiltable lever.

8. The combination with a body member having oppositely disposed apertures and oppositely disposed handles, of a concentric casing revolubly mounted therein, a pressure gauge fixed to the casing, a plunger working in the casing, fulcrum supporting bars in said apertures and extending beyond the walls of the body member, said supporting bars having longitudinal slots therein, a tiltable lever disposed between said supporting bars and having a corresponding longitudinal slot, and notches in the upper edge of said slot, a fulcrum bolt extending through said slots and having a triangular section to engage with said notches in the tiltable lever, a clamp nut for the fulcrum bolt, and indicating marks on the supporting bars for setting the fulcrum bolt.

9. The combination with a body member having oppositely disposed apertures and oppositely disposed handles, of a concentric casing revolubly mounted in the body member, a plunger working in the casing and forming therewith a pressure chamber, a pressure gauge mounted on the revoluble casing and in communication with the pressure chamber, fulcrum supporting bars extending transversely through the body member and disposed in said apertures, said supporting bars having longitudinal slots, a web uniting the outer ends of the supporting bars, a tiltable lever disposed between the supporting bars and having a corresponding longitudinal slot and a series of notches in the upper edge of the slot, a triangular fulcrum bolt extending transversely through the slots in the supporting bars and tiltable lever and engaging with the notches in the tiltable lever, marks on the supporting members to indicate the position for the fulcrum bolt, and other indicating marks intermediate the first named marks, for setting the supporting bars relative to the body member, said tiltable lever being arranged to actuate the working plunger.

Signed this 13th day of August, 1921.

IWAO ONO.